United States Patent
Itaya et al.

(10) Patent No.: US 11,271,397 B2
(45) Date of Patent: Mar. 8, 2022

(54) SYSTEM STATE ESTIMATION DEVICE AND SYSTEM STATE ESTIMATION METHOD

(71) Applicant: Mitsubishi Electric Corporation, Tokyo (JP)

(72) Inventors: Nobuhiko Itaya, Tokyo (JP); Tomihiro Takano, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 135 days.

(21) Appl. No.: 16/617,733

(22) PCT Filed: Jun. 8, 2017

(86) PCT No.: PCT/JP2017/021331
§ 371 (c)(1),
(2) Date: Nov. 27, 2019

(87) PCT Pub. No.: WO2018/225219
PCT Pub. Date: Dec. 13, 2018

(65) Prior Publication Data
US 2020/0195006 A1     Jun. 18, 2020

(51) Int. Cl.
*H02J 3/00*     (2006.01)
*H02J 13/00*    (2006.01)

(52) U.S. Cl.
CPC .............. *H02J 3/004* (2020.01); *H02J 13/00* (2013.01)

(58) Field of Classification Search
CPC ........ H02J 3/004; H02J 13/00; H02J 2203/10; H02J 3/003; H02J 13/00034;
(Continued)

(56) References Cited

U.S. PATENT DOCUMENTS

| 2003/0078797 A1* | 4/2003 | Kanbara | G06Q 30/00 705/412 |
| 2010/0106332 A1* | 4/2010 | Chassin | G06Q 40/04 700/278 |

(Continued)

FOREIGN PATENT DOCUMENTS

| EP | 2763261 A1 | 8/2014 |
| JP | 2005237187 A | 9/2005 |

(Continued)

OTHER PUBLICATIONS

Office Action dated Oct. 28, 2020 in corresponding Indian Patent Application No. 201947048011, 6 pages.
(Continued)

*Primary Examiner* — Ziaul Karim
(74) *Attorney, Agent, or Firm* — Buchanan Ingersoll & Rooney PC (57) ABSTRACT

A system state estimation device according to the present invention includes: a classification unit that classifies first meter data into a plurality of groups, the first meter data being meter data metered in a first time zone by at least some of a plurality of smart meters; a statistic calculation unit that calculates variation of the first meter data for each of the groups; used data determination unit that determines, for each of the groups, whether to use meter data in a second time zone or a substitute value in estimation computation for estimating a system state in the second time zone on the basis of the variation; and an aggregation unit and a power flow calculation unit that perform the estimation computation on the basis of a result of determination performed by the used data determination unit.

15 Claims, 8 Drawing Sheets (58) Field of Classification Search
CPC .... H02J 13/00002; Y04S 10/30; Y04S 10/50; Y02E 60/00
See application file for complete search history.

(56) References Cited

U.S. PATENT DOCUMENTS

| | | | |
|---|---|---|---|
| 2013/0318217 A1* | 11/2013 | Imes | H04L 43/08 709/221 |
| 2014/0200729 A1 | 7/2014 | Yamane et al. | |
| 2015/0178630 A1 | 6/2015 | Miyazaki et al. | |
| 2017/0108351 A1* | 4/2017 | Shimizu | G01D 4/002 |

FOREIGN PATENT DOCUMENTS

| | | | |
|---|---|---|---|
| JP | 2015109737 A | 6/2015 | |
| WO | 2013031886 A1 | 3/2013 | |
| WO | 2013046938 A1 | 4/2013 | |

OTHER PUBLICATIONS

International Search Report (with English Translation) and Written Opinion issued in corresponding International Patent Application No. PCT/JP2017/021331, 7 pages (dated Jul. 18, 2017).
Notification of Reasons for Refusal (with English Translation) in Japanese Patent Application No. 2017-555732, 7 pages (dated Dec. 19, 2017).

* cited by examiner

| SM NUMBER |
|---|
| ACTIVE POWER AMOUNT |
| REACTIVE POWER AMOUNT |

FIG.8

| SM NUMBER | CONTRACT CAPACITY | CONTRACT TYPE | INDUSTRY TYPE |
|---|---|---|---|
| 1 | $X_1$ | $Y_1$ | $Z_1$ |
| 2 | $X_2$ | $Y_1$ | $Z_1$ |
| 3 | $X_3$ | $Y_2$ | $Z_2$ |
| | | | |

FIG.9

| GROUP NUMBER | DEFINITION | | |
|---|---|---|---|
| | CONTRACT CAPACITY | CONTRACT TYPE | INDUSTRY TYPE |
| 1 | $X_1$ | $Y_1$ | $Z_1$ |
| 2 | $X_2$ | $Y_1$ | $Z_1$ |
| 3 | $X_3$ | $Y_1$ | $Z_1$ |
| 4 | $X_1$ | $Y_1$ | $Z_2$ |
| | | | |
| | | | |

FIG.10

| GROUP NUMBER | DEFINITION | |
| --- | --- | --- |
| | INDUSTRY TYPE | SEASON |
| 1 | $Z_1$ | SPRING |
| 2 | $Z_1$ | SUMMER |
| 3 | $Z_1$ | AUTUMN |
| 4 | $Z_1$ | WINTER |
| 5 | $Z_2$ | SPRING |
| | | |

FIG.11

| GROUP NUMBER | DEFINITION | |
| --- | --- | --- |
| | INDUSTRY TYPE | DAY OF WEEK |
| 1 | $Z_1$ | WEEKDAY |
| 2 | $Z_1$ | SATURDAY |
| 3 | $Z_1$ | HOLIDAY |
| 4 | $Z_2$ | WEEKDAY |
| 5 | $Z_2$ | SATURDAY |
| | | |

FIG.12

| GROUP NUMBER | 0:00 TO 0:30 | 0:30 TO 1:00 | | 23:30 TO 24:00 |
|---|---|---|---|---|
| 1 | $\mu_1(1)$ | $\mu_1(2)$ | | $\mu_1(48)$ |
| 2 | $\mu_2(1)$ | $\mu_2(2)$ | | $\mu_2(48)$ |
| 3 | $\mu_3(1)$ | $\mu_3(3)$ | | $\mu_3(48)$ |
| | | | | |

FIG.13

| GROUP NUMBER | 0:00 TO 0:30 | 0:30 TO 1:00 | | 23:30 TO 24:00 |
|---|---|---|---|---|
| 1 | $\sigma_1(1)$ | $\sigma_1(2)$ | | $\sigma_1(48)$ |
| 2 | $\sigma_2(1)$ | $\sigma_2(2)$ | | $\sigma_2(48)$ |
| 3 | $\sigma_3(1)$ | $\sigma_3(3)$ | | $\sigma_3(48)$ |
| | | | | |

SYSTEM STATE ESTIMATION DEVICE AND SYSTEM STATE ESTIMATION METHOD

FIELD

The present invention relates to a system state estimation device and a system state estimation method for estimating information indicating the state of a power system.

BACKGROUND

In recent years, in power distribution systems, switches with sensors capable of measuring active powers and reactive powers in addition to voltages have been increasingly used as switches at feeding points on distribution lines. While only current sensors provided at feeding points on distribution lines measure currents at the feeding points in related art, use of such switches with sensors enables active powers and reactive powers at feeding points on distribution lines to be obtained.

In the meantime, there have been demands for obtaining the states of power systems (hereinafter simply referred to as systems) for various purposes including management, operation, and control of the systems. Examples of the state of a system include system voltage, system current, transformer load, and a load distribution. Even if the aforementioned switches with sensors are used, only information at the feeding points can be obtained, but the states of other parts in the system cannot be obtained. In this regard, Patent Literature 1 teaches a technology for estimating voltage distribution in a power distribution system by utilizing data metered by smart meters.

CITATION LIST

Patent Literature

Patent Literature 1: Japanese Patent Application Laid-open No. 2015-109737

SUMMARY

Technical Problem

Meter data of smart meters are acquired in 30-minute periods, and managed by a metering data management system (MDMS). Thus, in a case where the technology taught in Patent Literature 1 is applied to estimation of the state of a power distribution system, a device for estimating the state of the power distribution system acquires a huge amount of data, that is, meter data of 30-minute periods of tens of millions of smart meters, for example, from an MDMS or the like, and performs a process of estimating the state in each section in the power distribution system by using the data. Thus, for implementation of the technology taught in Patent Literature 1, hardware having high data processing capacity and communication capability is necessary.

The present invention has been made in view of the above, and an object thereof is to provide a system state estimation device capable of estimating the state of a system while reducing the amount of meter data used for processing.

Solution to Problem

A system state estimation device according to an aspect of the present invention includes: a classification unit that classifies first meter data into a plurality of groups, the first meter data being meter data metered in a first time zone by at least some of a plurality of metering devices; and a calculation unit that calculates a variation of the first meter data for each of the groups. The system state estimation device further includes: a determination unit that determines, for each of the groups, whether to use meter data in a second time zone or a substitute value in estimation computation for estimating a system state in the second time zone, on the basis of the variation; and a computation unit that performs the estimation computation on the basis of a result of determination performed by the determination unit.

Advantageous Effects of Invention

A system state estimation device according to the present invention produces an effect of estimating the state of a system while reducing the amount of meter data used for processing.

DESCRIPTION OF EMBODIMENTS

A system state estimation device and a system state estimation method according to an embodiment of the present invention will be described in detail below with reference to the drawings. Note that the present invention is not limited to the embodiment.

Embodiment

Figure 1:
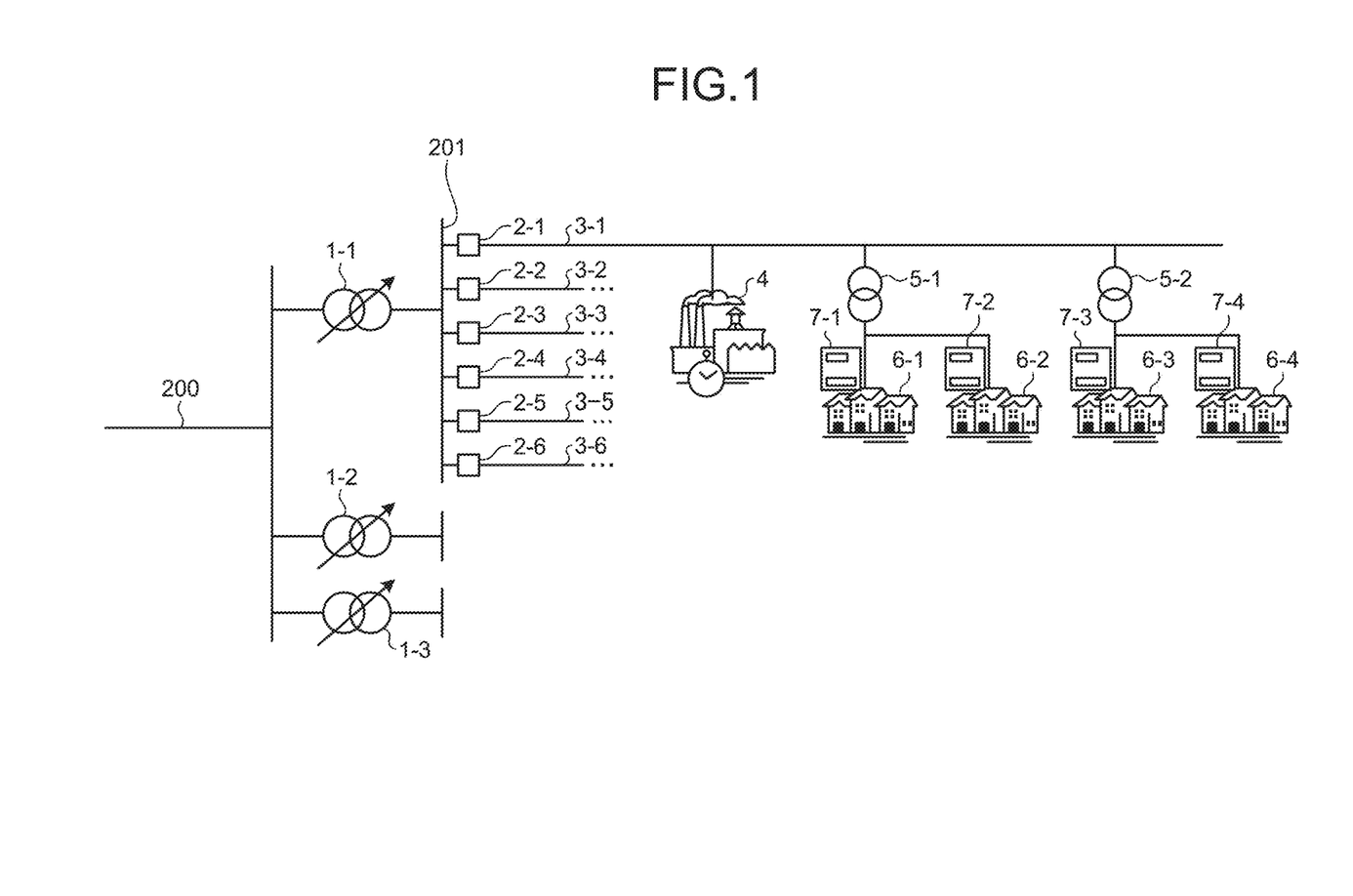
FIG. 1 is a diagram illustrating an example of a configuration of a power distribution system according to the present invention.

FIG. 1 is a diagram illustrating an example of a configuration of a power distribution system according to the present invention. As illustrated in FIG. 1, the power distribution system according to the present embodiment includes load ratio control transformers (LRTs; on-load tap changing transformers) 1-1 to 1-3, switches with sensors 2-1 to 2-6, and distribution lines 3-1 to 3-6.

The LRTs 1-1 to 1-3 are transformers for power distribution, and are installed in substations, for example. While three LRTs are illustrated in FIG. 1, the number of LRTs is not limited to the example, and may be any number not smaller than one.

The LRTs 1-1 to 1-3 are connected with a power transmission line 200 carrying 6,600 V or 7,700 V, for example. In addition, the LRT 1-1 is connected with a bus 201. The distribution lines 3-1 to 3-6, which are distribution lines of high-voltage systems, are connected in parallel with the bus 201. A high-voltage system is a system at 6,600 V, for example. The distribution lines 3-1 to 3-6 are distribution lines of high-voltage systems. The switches with sensors 2-1 to 2-6 are connected with feeding points, that is, upstream end points of the distribution lines 3-1 to 3-6, respectively. Hereinafter, the distribution lines 3-1 to 3-6 will be referred to as distribution lines 3 when individual distribution lines need not be distinguished from each other, and the switches with sensors 2-1 to 2-6 will be referred to as switches with sensors 2 when individual switches with sensors need not be distinguished from each other. While an example in which six distribution lines are connected with the bus 201 is illustrated in FIG. 1, the number of distribution lines connected with the bus 201 is not limited to this example, and may be any number not smaller than one. Although not illustrated, distribution lines are connected with buses connected with the LRTs 1-2 and 1-3 in a manner similar to the LRT 1-1.

A high-voltage load 4 is connected with the distribution line 3-1. The high-voltage load 4 is a load connected with a distribution line in a high-voltage system, such as a load at a consumer's premise such as a factory, for example. In addition, pole-mounted transformers 5-1 and 5-2 are connected with the distribution line 3-1. Hereinafter, the pole-mounted transformers 5-1 and 5-2 will be referred to as pole-mounted transformers 5 when individual pole-mounted transformers need not be distinguished from each other. The pole-mounted transformers 5-1 and 5-2 are transformers that convert high-voltage power into low-voltage power with a voltage of 100 V or 200 V, for example, and output the resulting low-voltage power to low-voltage distribution lines. Low-voltage loads 6-1 and 6-2 are connected with a low-voltage distribution line connected with the pole-mounted transformer 5-1. Low-voltage loads 6-3 and 6-4 are connected with a low-voltage distribution line connected with the pole-mounted transformer 5-2. The low-voltage loads 6-1 to 6-4 are loads at consumers' premises including typical households and offices.

Smart meters 7-1 to 7-4 are connected with the low-voltage loads 6-1 to 6-4, respectively. The smart meters 7-1 to 7-4 are metering devices that meter the amounts of power used by the low-voltage loads 6-1 to 6-4, respectively. Hereinafter, the low-voltage loads 6-1 to 6-4 will be referred to as low-voltage loads 6 when individual low-voltage loads need not be distinguished from each other, and the smart meters 7-1 to 7-4 will be referred to as smart meters 7 when individual smart meters need not be distinguished from each other. Although two pole-mounted transformers 5 are illustrated in FIG. 1, a large number of pole-mounted transformers 5 are typically connected with the distribution line 3-1. In addition, although four low-voltage loads representing low-voltage loads are illustrated, a large number of low-voltage loads are typically connected with low-voltage distribution lines. In addition, smart meters are connected with some or all of a large number of low-voltage loads.

Although not illustrated in FIG. 1, some consumers have power generating installations, and smart meters 7 installed at the consumers' premises having power generating installations each measure the difference between the power generation amount of the power generating installation and the amount of power used by the low-voltage loads. Alternatively, the smart meters 7 may each measure the power generation amount and the amount of power used by the low-voltage loads individually. In addition, the high-voltage load 4 may be provided with a smart meter.

Figure 2:
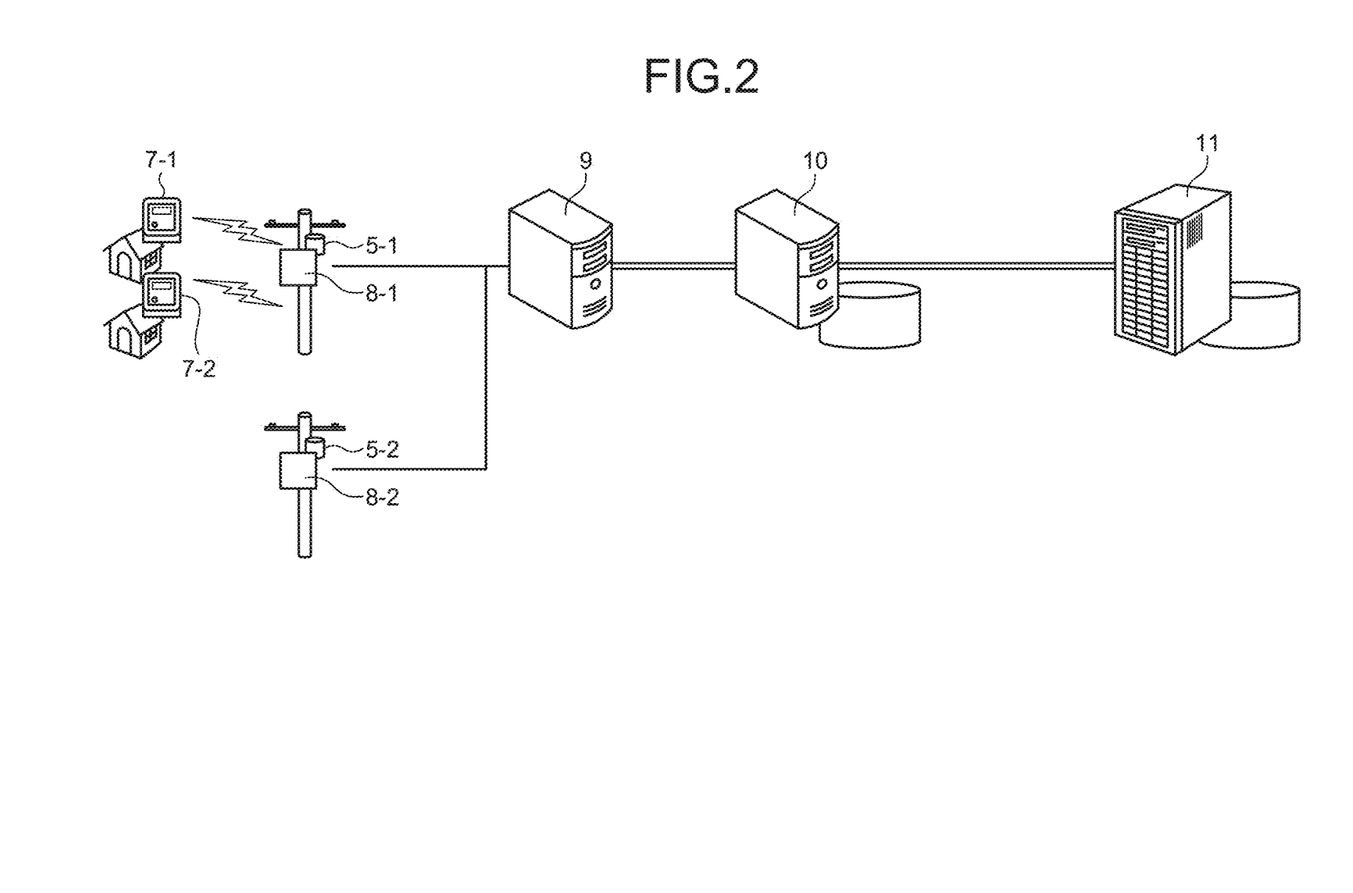
FIG. 2 is a diagram illustrating an example of a configuration of an automatic meter reading system.

FIG. 2 is a diagram illustrating an example of a configuration of an automatic meter reading system according to the present embodiment. FIG. 2 is a system for automatic meter reading by using meter data metered by the smart meters 7 in the power distribution system illustrated in FIG. 1. In the example illustrated in FIG. 2, the automatic meter reading system includes smart meters 7-1 and 7-2, concentrators 8-1 and 8-2, a head end system (HES) 9, and an MDMS 10. The smart meters 7-1 and 7-2 are capable of performing radio communication, and transmit meter data measured by the smart meters 7-1 and 7-2 themselves in the form of radio signals to the concentrator 8-1, which is a master station. Meter data include an active power amount. Meter data may further include a reactive power amount. The concentrator 8-1 summarizes the meter data received from the smart meters 7-1 and 7-2, and transmits the summarized meter data to the HES 9. Although not illustrated in FIG. 2, the concentrator 8-2 also summarizes the meter data received from smart meters 7, and transmits the summarized meter data to the HES 9. Hereinafter, the concentrators 8-1 and 8-2 will be referred to as concentrators 8 when individual concentrators need not be distinguished from each other. For each of the smart meters 7, a concentrator 8 that serves as a master station associated with the smart meter 7 is set.

The HES 9 collects the meter data from the concentrators 8, and transmits the collected meter data to the MDMS 10. The MDMS 10 manages the meter data received from the HES 9. Thus, the MDMS 10 manages meter data metered by the smart meters 7, which are received via the concentrator 8 and the HES 9.

While an example in which a concentrator 8 is set on each of utility poles on which the pole-mounted transformers 5 are provided is illustrated in FIG. 2, the locations of the concentrators 8 are not limited to this example.

The system state estimation device 11 of the present embodiment is capable of communicating with the MDMS 10 of the automatic meter reading system. As will be described later, the system state estimation device 11 acquires meter data to be used for processing from the MDMS 10, and estimates a system state by using the meter data. In addition, the system state estimation device 11 of the present embodiment is capable of storing classified data 14, an average database (DB) 15, a standard deviation DB 16, a contract DB 17, a smart meter installation position DB 18, and a system equipment DB 19. The classified data 14, the average DB 15, the standard deviation DB 16, the contract DB 17, the smart meter installation position DB 18, and the system equipment DB 19 will be described later.

Figure 3:
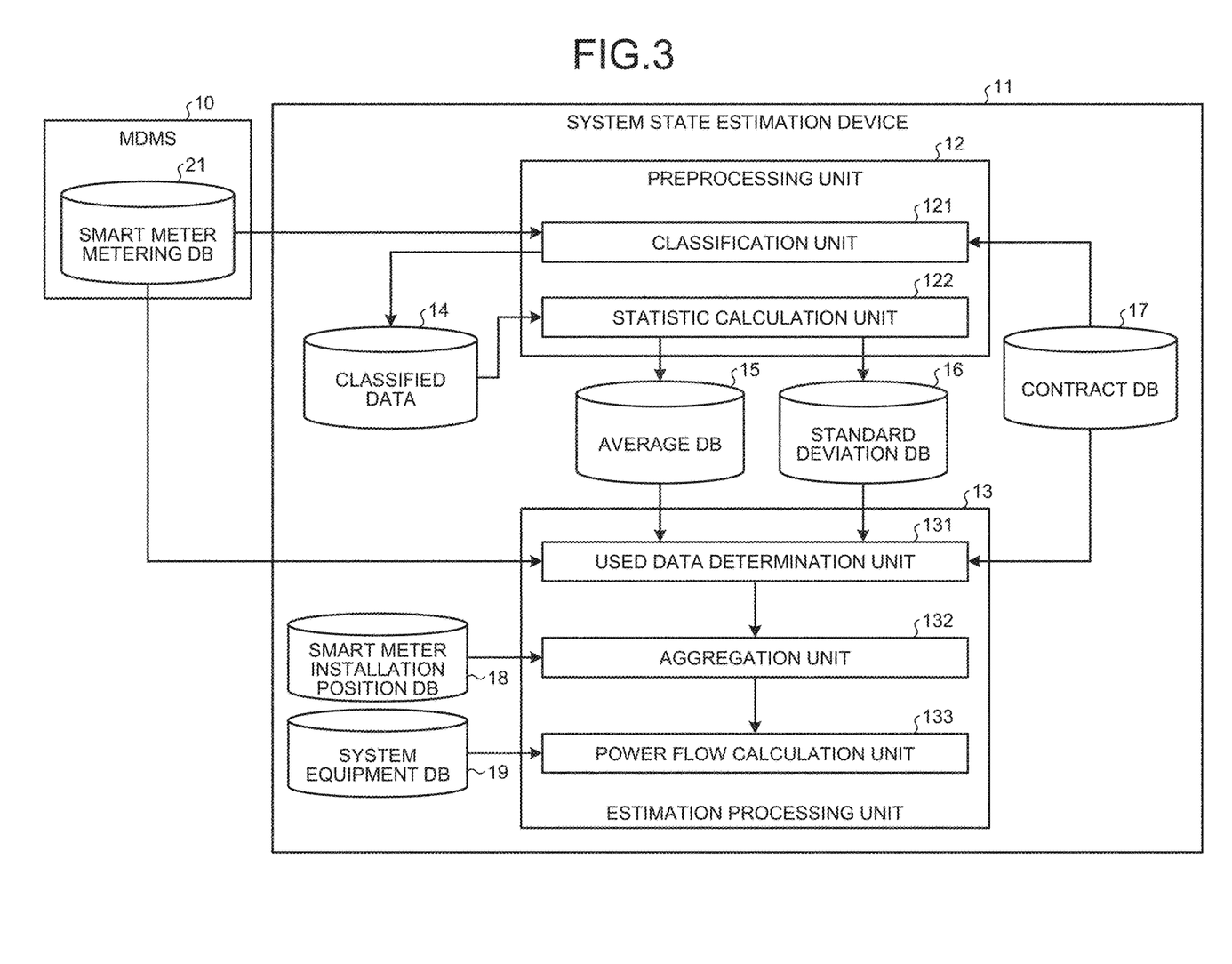
FIG. 3 is a diagram illustrating an example of a configuration of a system state estimation device.

FIG. 3 is a diagram illustrating an example of a configuration of the system state estimation device 11 of the present embodiment. As illustrated in FIG. 3, the system state estimation device 11 of the present embodiment includes a preprocessing unit 12 and an estimation processing unit 13.

The MDMS 10 stores meter data metered by the smart meters 7 in the form of a smart meter metering DB 21.

The preprocessing unit 12 includes a classification unit 121 and a statistic calculation unit 122. The classification unit 121 acquires first meter data, which is part of meter data stored in the smart meter metering DB 21 of the MDMS 10, from the MDMS 10. The classification unit 121 then classifies the first meter data into a plurality of groups on the basis of the contract DB 17, further classifies the classified data according to time zone, and saves the resulting data as classified data 14. The contract DB 17 stores in advance contract information, which is information relating to contracts, such as the contract type and the industry type for each of the smart meters 7. The time zones are time zones in a day, and include 48 time zones of 30 minutes such as from 0:00 to 0:30, from 0:30 to 1:00, . . . , for example. Note that the time zones are not limited to 30-minute time zones, and may be one-hour time zones, two-hour time zones, etc. The groups are each a set of smart meters 7 in which at least one of contract capacities, industry types, contract types, seasons, and days of week are the same. Details of the definition of the groups will be described later.

The statistic calculation unit 122 is a calculation unit that calculates, for each of the groups, an average and a standard deviation of meter data associated with the group in each time zone by using the classified data 14. The statistic calculation unit 122 stores the average of each group in the form of the average DB 15, and the standard deviation of each group in the form of the standard deviation DB 16. In a case where the meter data of the smart meters 7 include active power amounts but do not include reactive power amounts, the statistic calculation unit 122 converts the active power amounts into active powers, and calculates the average and the standard deviation of the active powers. In a case where the meter data of the smart meters 7 do not include reactive power amounts, the statistic calculation unit 122 sets a predetermined value, such as 0, for example, for the reactive powers, and calculates the statistics. In addition, in a case where the meter data of the smart meters 7 include active power amounts and reactive power amounts, the statistic calculation unit 122 correspondingly converts the active power amounts and the reactive power amounts into active powers and reactive powers, and calculates the average and the standard deviation of the active powers and those of the reactive powers.

Figure 4:
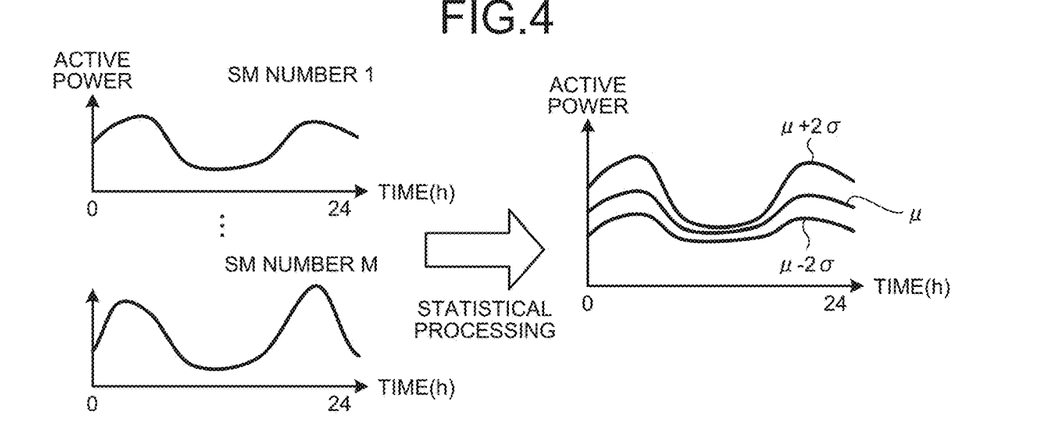
FIG. 4 illustrates graphs presenting an example of the average and the standard deviation in a case where meter data of M smart meters are acquired.

FIG. 4 illustrates graphs presenting an example of the average and the standard deviation in a case where the meter data of M smart meters 7 are acquired as part of meter data. In the example illustrated in FIG. 4, an example in which meter data of the active power amounts of M smart meters 7 having smart meter numbers (hereinafter abbreviated as SM numbers) 1 to M, which are identification information of the smart meters 7, are converted into active powers and statistically processed is presented. In the right part of FIG. 4, $\mu$ represents the average of M active powers associated with M smart meters 7 at each of times of a day, and $\sigma$ represents the standard deviation of M active powers at each of times of the day. While the active powers are expressed by curves in FIG. 4, the actual active powers are discrete values in time zones as described above. In the present embodiment, as will be described below, it is determined whether to use meter data or a substitute value in estimation computation for estimating the system state, by using a standard deviation, which is an example of a value representing a variation obtained by statistically processing the part of meter data.

A used data determination unit 131 of the estimation processing unit 13 is a determination unit that performs a process of determining data to be used in each time zone for each group on the basis of the standard deviation DB 16 and the contract DB 17. The process of determining data to be used is a process of determining whether to use the meter data of the smart meters 7 or to use a substitute value as data to be used in processing performed by a subsequent aggregation unit 132. Specifically, it is determined to use the substitute value when $\sigma$ is equal to or smaller than a threshold, and it is determined to use the meter data when $\sigma$ exceeds the threshold, for example. The threshold may be determined in any manner, such as on the basis of error required in the power distribution system, for example. In one example, a threshold $\alpha$ can be determined by formula (1) below where the error required in the system is represented by $\varepsilon$, and the number (total number) of smart meters 7 belonging to a group is represented by N. k is a constant representing to which extent the probability of error is to be considered, such as k=1 in a case where error is desired to be suppressed with a probability corresponding to 1$\sigma$, or k=3 in a case where error is desired to be suppressed with a probability corresponding to 3$\sigma$, for example.

$$\alpha = \varepsilon / (k \times \sqrt{(N)}) \tag{1}$$

For example, in a case where error equal to or smaller than 5% for 1,000 kW is required in the power distribution system, $\varepsilon$ is 50 kW. In this case, when N=500 and k=3, $\alpha$ is about 0.75 kW.

For a group for which it is determined by the process of determining used data that the meter data of the smart meters 7 are to be used, the used data determination unit 131 acquires the meter data of the smart meters 7 associated with the group from the MDMS 10, converts the power amounts into powers, and then outputs the resulting powers to the aggregation unit 132. For a group for which it is determined by the process of determining used data that a substitute value is to be used, the used data determination unit 131 outputs the average associated with the group, which is stored in the average DB 15, together with the identification information representing the smart meters 7 associated with the group to the aggregation unit 132. Alternatively, for a group for which it is determined by the process of determining used data that a substitute value is to be used, any predetermined value may be used as the substitute value instead of the average stored in the average DB 15.

The aggregation unit 132 aggregates data for each unit section of estimation of the system state on the basis of the data received from the used data determination unit 131 and the smart meter installation position DB 18, and outputs the aggregation result to a power flow calculation unit 133. Specifically, the aggregation unit 132 obtains the active power and the reactive power of the load power in each unit section, and outputs the obtained load power to the power flow calculation unit 133. Specifically, the aggregation unit 132 adds the active powers and the reactive powers of the smart meters 7 in each unit section. For example, assume that L smart meters 7 (L is an integer not smaller than 1) in a group having a group number 1 and H smart meters 7 (H is an integer not smaller than 1) in a group having a group number 2 are present, in the i-th unit section (i is an integer not smaller than 1). Then, assume that, in a given time zone, it is determined by the process of determining used data that a substitute value is to be used for the group having the group number 1, and it is determined by the process of determining used data that meter data are to be used for the group having the group number 2. In this case, the active power $P_i$ of the load power in the time zone in the i-th unit section is determined by formula (2) below. Note that $\mu_i$ represents the average in the group with the group number 1 in the time zone, and $r_j$ (j=1, ..., H) represents the active power calculated from the meter data of the j-th smart meter 7 out of the H smart meters 7 in the i-th unit section.

$$P_i = L \times \mu_1 + (r_1 + r_2 + \ldots + r_H) \qquad (2)$$

A unit section refers to the range of a section in a system for which a result of estimation of the system state is calculated, and in a case where a load is calculated as the system state, for example, the unit section is a unit of the calculation of the load in the system. Examples of the unit section for estimation of the system state include a section associated with one pole-mounted transformer 5, a section separated by switches on a distribution line 3, which are not illustrated in FIG. 1, and a section associated with a plurality of pole-mounted transformers 5. Information indicating which unit section each smart meter 7 belongs to is stored in the smart meter installation position DB 18. For example, in a case where a unit section is defined as a section corresponding to one pole-mounted transformer 5, the association between a pole-mounted transformer 5 and smart meters 7 connected with the pole-mounted transformer 5 is stored in the smart meter installation position DB 18. Specifically, for example, the association between the number of a pole-mounted transformer 5, which is identification information of the pole-mounted transformer 5, and the SM numbers, which are identification information of smart meters 7, is stored in the smart meter installation position DB 18. Specific information stored in the smart meter installation position DB 18 is not limited to this example, and any information indicating the smart meters 7 associated with each unit section may be stored.

The power flow calculation unit 133 performs power flow calculation on the basis of the system equipment DB 19 and aggregation results received from the aggregation unit 132 to calculate voltage distribution, current distribution, and the like in the power distribution system. Information in the power distribution system needed for the power flow calculation, such as information indicating the positions of pole-mounted transformers 5 connected with each distribution line 3, and information indicating the impedance of each distribution line 3, is stored in advance in the system equipment DB 19. Any method including the Newton-Raphson method, and the Fast Decoupled Load Flow method can be used for a specific method of the power flow calculation performed by the power flow calculation unit 133.

The estimation computation for estimating the system state is performed by the aggregation unit 132 and the power flow calculation unit 133 as described above. Specifically, the aggregation unit 132 and the power flow calculation unit 133 are computation units that perform the estimation computation for estimating the system state on the basis of the results of determination by the used data determination unit 131.

Alternatively, the power flow calculation unit 133 may perform power flow calculation by further using active powers and reactive powers measured by the switches with sensors 2. Still alternatively, the power flow calculation unit 133 may correct aggregation results received from the aggregation unit 132 by using active powers and reactive powers measured by the switches with sensors 2, and perform power flow calculation by using the corrected aggregation results. For example, a load ratio in each unit section is calculated on the basis of the aggregation results received from the aggregation unit 132. The power flow calculation unit 133 obtains active powers and reactive powers in each unit section by using the ratio and active powers and reactive powers measured by the switches with sensors 2, and performs power flow calculation by using the obtained active powers and reactive powers.

Voltage distribution, current distribution, and the like calculated by the power flow calculation unit 133 may be used for voltage control in the power distribution system or facility planning in the power distribution system. In addition, while an example in which aggregation results obtained by the aggregation unit 132 are used for power flow calculation is described above, aggregation results obtained by the aggregation unit 132 may alternatively be used for obtaining the load on each pole-mounted transformer 5. This indicates whether or not each pole-mounted transformer 5 is overloaded. In addition, load distribution calculated with use of aggregation results obtained by the aggregation unit 132 may be used for facility planning or the like. Furthermore, in a case where a consumer's premise in which no smart meter 7 is installed is present among consumers' premises associated with a group for which it is determined that a substitute value is to be used as a result of the process of determining used data performed by the used data determination unit 131, the substitute value as described above may be used instead of the meter data associated with this consumer's premise. In addition, in collecting meter data from smart meters 7, meter data may not be collected from smart meters 7 of an industry type or in a time zone associated with a group for which it is determined that a substitute value is to be used. This reduces communication traffic in collection of meter data. In addition, in installation planning of smart meters 7, the number of smart meters 7 to be installed may be reduced in such a manner that no smart meters 7 are to be installed in consumers' premises associated with a group for which it is determined that a substitute value is to be used in all the time zones.

Note that, in calculating the average and the standard deviation of meter data in each time zone for each group, the statistic calculation unit 122 may calculate the average and the standard deviation in each unit section by using the smart meter installation position DB 18. As a result, the average and the standard deviation in each unit section in each time zone for each group are stored in the average DB 15 and the standard deviation DB 16. In this case, the used data determination unit 131 performs the process of determining used data in each unit section for each group and each time zone, and a substitute value for a unit section for which it is determined that a substitute value is to be used is output to the power flow calculation unit 133. For a combination of a group, a time zone, and a unit section for which it is determined that meter data are to be used, the used data determination unit 131 outputs active powers and reactive powers of the smart meters 7 to the aggregation unit 132 in a manner similar to the example described above. In this case, the aggregation unit 132 can use the average itself in the associated unit section instead of $L \times \mu_1$ in formula (2) described above, for example, for aggregation.

Figure 5:
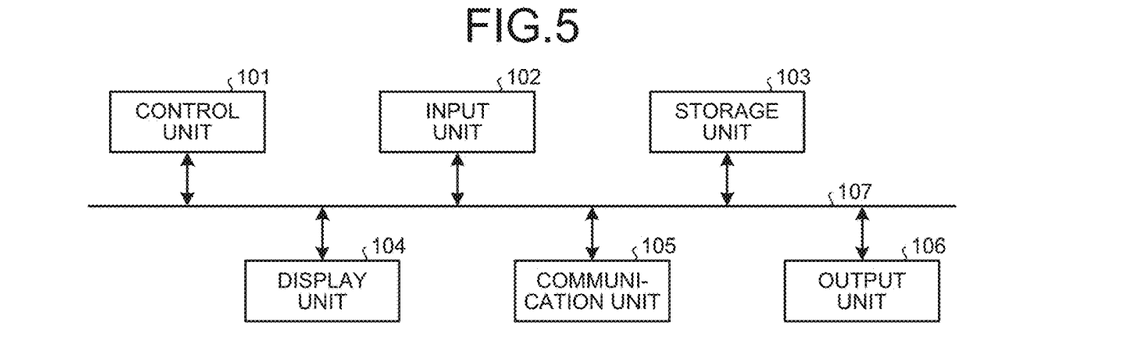
FIG. 5 is a diagram illustrating an example of a configuration of a computing system.

The system state estimation device 11 of the present embodiment is, specifically, a computing system, that is, a computer. The computing system functions as the system state estimation device 11 by execution of system state estimation programs on the computing system. FIG. 5 is a diagram illustrating an example of a configuration of the computing system according to the present embodiment. As illustrated in FIG. 5, the computing system includes a control unit 101, an input unit 102, a storage unit 103, a display unit 104, a communication unit 105, and an output unit 106, which are connected with each other via a system bus 107.

In FIG. 5, the control unit 101 is a processor such as a central processing unit (CPU), and executes the system state estimation programs of the present embodiment. The input unit 102 is constituted by a keyboard, a mouse, and the like, for example, and used by a user of the computing system to input various information. The storage unit 103 includes various kinds of memories such as a random access memory (RAM) and a read only memory (ROM) and a storage device such as a hard disk, and stores programs to be executed by the control unit 101, data obtained in the process of processing, and the like. In addition, the storage unit 103 is also used as a temporary storage area of programs. The display unit 104 is constituted by a display, a liquid crystal display (LCD) panel or the like, and displays various screens for the user of the computing system. The communication unit 105 is a transmitter and receiver that performs communication processes. Note that FIG. 5 is an example, and the configuration of the computing system is not limited to the example of FIG. 5.

Here, an example of operation of the computing system until the system state estimation programs of the present embodiment become in an executable state will be explained. In the computing system having the above-described configuration, the system state estimation programs are installed in the storage unit 103 from a compact disc (CD)-ROM or digital versatile disc (DVD)-ROM set in a CD-ROM drive or a DVD-ROM drive, which is not illustrated, for example. In execution of the system state estimation programs, the system state estimation programs read from the storage unit 103 are stored in a predetermined area in the storage unit 103. In this state, the control unit 101 performs a system state estimation process of the present embodiment in accordance with the programs stored in the storage unit 103.

While the programs describing the system state estimation process are provided with use of the CD-ROM or the DVD-ROM as a recording medium in the present embodiment, the programs are not limited thereto, and may be provided via a transmission medium such as the Internet via the communication unit 105, for example, depending on the configuration of the computing system and the capacity of the provided programs.

The preprocessing unit 12 and the estimation processing unit 13 illustrated in FIG. 3 are implemented by the control unit 101 and the communication unit 105 in FIG. 5. The classified data 14, the average DB 15, the standard deviation DB 16, the contract DB 17, the smart meter installation position DB 18, and the system equipment DB 19 illustrated in FIG. 3 are stored in the storage unit 103.

Figure 6:
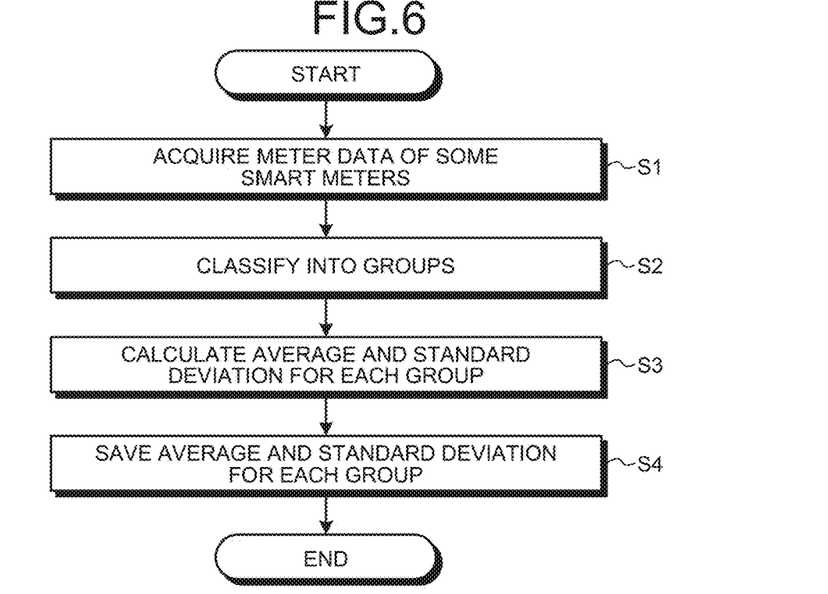
FIG. 6 is a flowchart illustrating an example of procedures performed by a preprocessing unit.

Next, details of the system state estimation process of the embodiment using the meter data of the smart meters 7 will be explained. FIG. 6 is a flowchart illustrating an example of procedures performed by the preprocessing unit 12 of the present embodiment. First, the classification unit 121 of the preprocessing unit 12 acquires part of meter data of smart meters 7 managed by the MDMS 10 from the MDMS 10 (step S1). In the smart meter metering DB 21 of the MDMS 10, meter data transmitted from all of the smart meters 7 managed by the MDMS 10 are stored.

Figure 7:
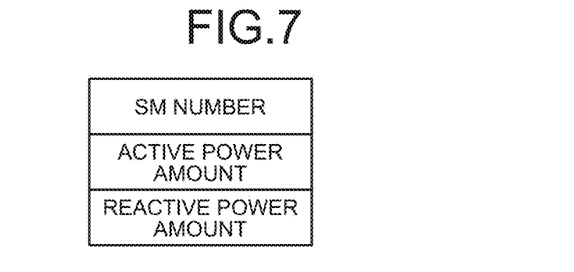
FIG. 7 is a diagram illustrating an example of a structure of meter data transmitted from a smart meter.

FIG. 7 is a diagram illustrating an example of a structure of meter data transmitted from a smart meter 7. FIG. 7 illustrates an example of the structure of meter data transmitted from a smart meter 7 that meters an active power amount and a reactive power amount. As illustrated n FIG. 7, meter data transmitted from a smart meter 7 include an SM number, which is identification information of the smart meter 7, an active power amount, and a reactive power amount. Note that, as described above, some smart meters 7 do not measure the reactive power amounts, and in this case, the meter data includes no reactive power amount but includes an SM number and an active power amount. The structure of meter data transmitted from a smart meter 7 is not limited to the example of FIG. 7, and only needs to include at least an SM number and an active power amount, and meter data may further include a voltage value or the like measured by the smart meter 7, for example.

The part of meter data acquired from the MDMS 10 in step S1 may be determined in any manner that the average and the standard deviation for each group calculated from the meter data can be regarded as the average and the standard deviation for each group of all the smart meters 7 without any problem. Thus, the part of meter data are determined so that the number of pieces of meter data from which the average and the standard deviation for each group are calculated is a certain number or larger. It is therefore desirable to determine, as the part of meter data, meter data of smart meters 7 that are less biased under a specific condition and where the number of meter data associated with each group is not smaller than a certain number. For example, when the MDMS 10 manages tens of millions of smart meters 7, meter data of about 1,000 smart meters 7 can be determined as some meter data acquired from the MDMS 10 in step S1. In this case, the 1,000 smart meters 7 may be randomly extracted so that groups to which the smart meters 7 belong become random and the numbers of pieces of meter data in the groups are thus less biased, or the number of the pieces of part of meter data may be determined for each group. Note that the number of smart meters 7 corresponding to the part of meter data acquired from the MDMS 10 in step S1 is not limited to 1,000. A first time zone, which is a time zone in which the part of meter data acquired from the MDMS 10 in step S1 are metered, may be or may not be the same as a second time zone, which is a time zone in which meter data used as subject of estimation of the system state, which will be described later, are measured.

In addition, while an example in which meter data of some smart meters 7 are acquired in step S1 is described herein, meter data of all the smart meters 7 may be acquired, and the processes from step S2 to step S4, which will be describe later, may be performed using the meter data of all the smart meters 7. Thus, in step S1, the classification unit 121 may acquire meter data in the first time zone of at least some smart meters 7 among all the smart meters 7 managed by the MDMS 10.

Figure 8:
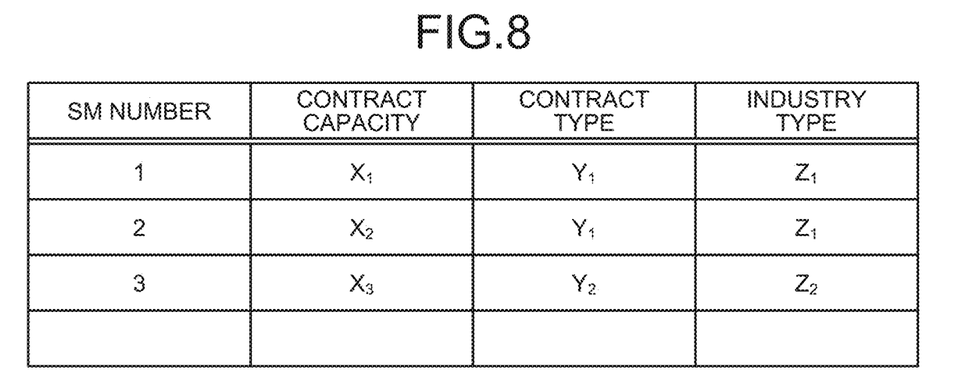
FIG. 8 is a table illustrating an example of contract information stored in a contract DB.

The description refers back to FIG. 6, in which the classification unit 121 of the system state estimation device 11 classifies first meter data, which are data acquired from the MDMS 10 in step S1, into groups on the basis of the contract DB 17 (step S2). The classification unit 121 saves the classified data as classified data 14. FIG. 8 is a table illustrating an example of contract information stored in the contract DB 17. In the example illustrated in FIG. 8, the contract information includes an SM number, a contract capacity, a contract type, and an industry type. The contract information illustrated in FIG. 8 is an example, and the content and the specific structure of the contract information are not limited to the example illustrated in FIG. 8.

Figure 9:
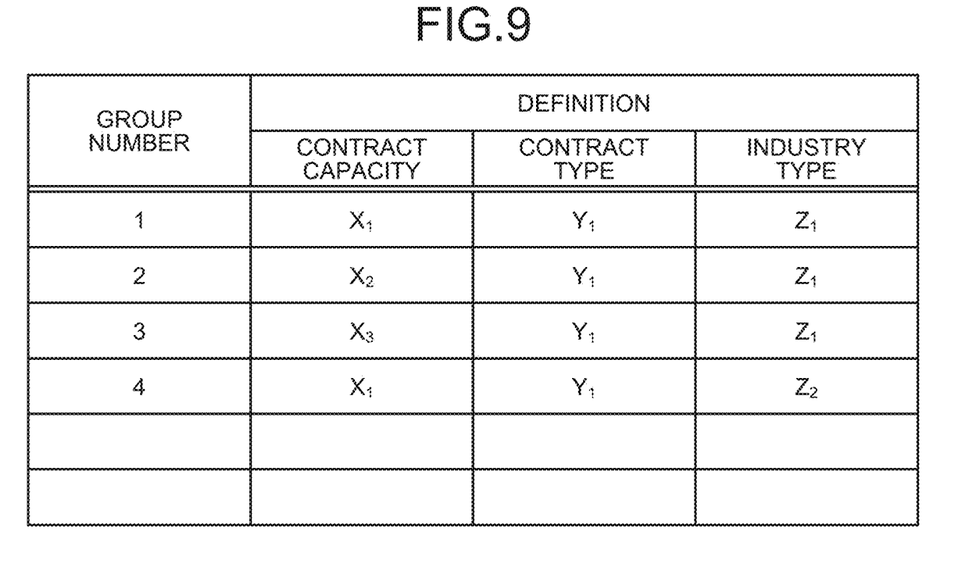
FIG. 9 is a table illustrating an example of definition of groups.
Figure 10:
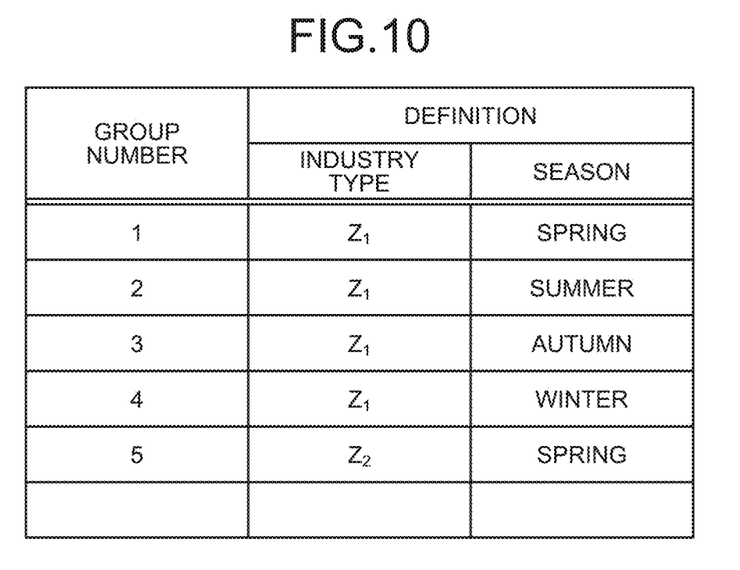
FIG. 10 is a table illustrating an example of definition of groups.
Figure 11:
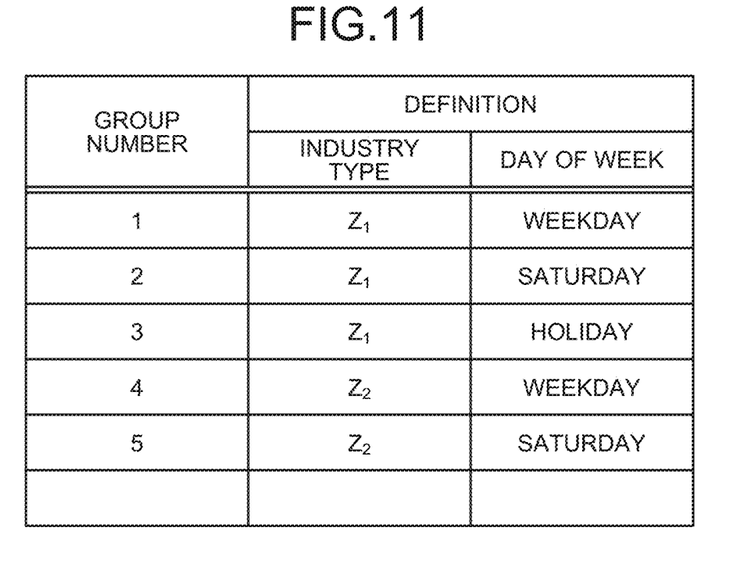
FIG. 11 is a table illustrating an example of definition of groups.

Here, an example of definitions of groups in the present embodiment will be explained. FIGS. 9, 10, and 11 are tables illustrating examples of the definitions of groups. In the example illustrated in FIG. 9, groups are defined on the basis of the contract capacity, the contract type, and the industry type. Specifically, in the example illustrated in FIG. 9, when all of the contract capacities, the contract types, and the industry types of meter data are the same, the meter data belong to the same group, and when at least one of the contract capacities, the contract types, and the industry types of meter data are different, the meter data belong to different groups.

In the example illustrated in FIG. 10, groups are defined on the basis of the industry type and the season. Specifically, in the example illustrated in FIG. 10, when both of the industry types and the seasons of meter data are the same, the meter data belong to the same group, and when at least one of the industry types and the seasons are different, the meter data belong to different groups.

In the example illustrated in FIG. 11, groups are defined on the basis of the industry types and the days of week. Specifically, in the example illustrated in FIG. 11, when both of the industry types and the days of week of meter data are the same, the meter data belong to the same group, and when at least one of the industry types and the days of week are different, the meter data belong to different groups.

The definitions of groups illustrated in FIGS. 9, 10, and 11 are examples, and the definition of groups is not limited to the examples. For example, groups are defined by at least one of the contract capacity, the contract type, the industry type, the season, the month, the temperature, the weather, and the day of week. Alternatively, groups may be defined by a combination of any two or more items of the contract capacity, the contract type, the industry type, the season, the month, the temperature, the weather, and the day of week. Alternatively, groups may be defined by a combination including items other than the contract capacity, the contract type, the industry type, the season, the month, the temperature, the weather, and the day of week. Thus, groups may be determined on the basis of at least one of the contract types and the industry types of consumers associated with smart meters 7. Alternatively, groups may be determined on the basis of the contract capacities of consumers associated with smart meters 7. Alternatively, groups may be determined on the basis of at least one of the seasons, the temperatures, and the weather in or at which smart meters 7 are metered.

In addition, the classification unit 121 may correct meter data in a group according to at least one of the contract capacity, the season, the temperature, and the weather, and save the corrected meter data as the classified data 14. For example, assume that groups are defined on the basis of the industry types and the days of week as in the example illustrated in FIG. 11. In this case, meter data of the smart meters 7 with the same day of week and the same industry type are classified as the same group even when the contract capacities thereof are different. In addition, power consumed by loads associated with each smart meter 7 tends to be roughly proportional to the contract capacity. Thus, the classification unit 121 can correct the active power amount in the meter data of each smart meter 7 by formula (3) below. The classification unit 121 can similarly correct the reactive power amount. B is a predetermined constant.

(corrected active power amount)=(active power amount in meter data)/(contract capacity)×B (3)

In a case where the temperature at metering by each smart meter 7 can be acquired from a weather information service or the like, the classification unit 121 can correct meter data by using the temperature. Alternatively, instead of the temperature acquired from a weather information service or the like, the classification unit 121 can correct meter data by using a mean annual temperature. For example, a correction amount to be added to or subtracted from meter data depending on the temperature is determined in advance on the basis of prediction of the relation between the temperature and the active power amount. In other words, the correction amount $\delta(t_p)$ when the temperature is $t_p$ is determined in advance. The classification unit 121 then adds or subtracts the correction amount depending on the corresponding temperature to or from each meter data. Alternatively, a correction coefficient by which meter data are to be multiplied may be determined in advance depending on the temperature. In a similar manner, a correction amount to be added to or subtracted from meter data or a correction coefficient by which meter data are to be multiplied may be determined in advance depending on the weather such as sunny, cloudy and rainy, and the meter data may be corrected with use of such values. The classification unit 121 may perform a plurality of kinds of corrections such as performing both of the correction depending on the contract capacity and the correction depending on the temperature. In addition, different values may be used for the correction coefficient, the correction amount and the like used for the correction described above, depending on the industry type, the season, and the like. The correction as described above makes the standard deviation smaller, increases the number of cases where it is determined that a substitute value is to be used, and reduces data used for processing.

The description refers back to FIG. 6, in which, after step S2, the statistic calculation unit 122 calculates the average and the standard deviation for each group by using the classified data 14 (step S3). More specifically, the statistic calculation unit 122 calculates, for each group, the average and the standard deviation of meter data associated with the group in each time zone. Note that the classified data 14 may be deleted after completion of step S3.

The statistic calculation unit 122 saves the average and the standard deviation for each group (step S4). More specifically, the statistic calculation unit 122 saves the average and the standard deviation in each time zone for each group in the form of the average DB 15 and the standard deviation DB 16, correspondingly. The processes in the preprocessing unit 12 are thus terminated.

Figure 12:
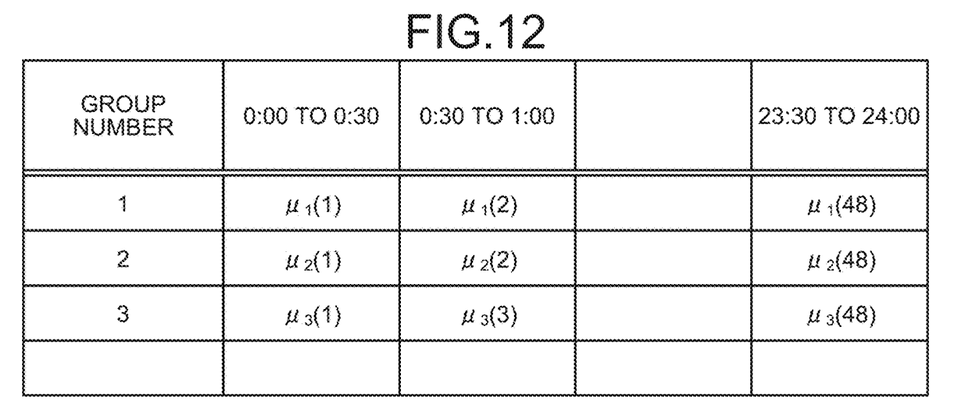
FIG. 12 is a table illustrating an example of averages stored in an average DB.

FIG. 12 is a table illustrating an example of averages stored in the average DB 15. As illustrated in FIG. 12, an average in each time zone for each group is stored in the average DB 15. In FIG. 12, when first to 48th time zones in units of 30 minutes are defined in such a manner that a time zone from 0:00 to 0:30 is the first time zone, a time zone from 0:30 to 1:00 is the second time zone, and so on, the average value for a q-th group (q is an integer not smaller than 1) in an s-th time zone (s=1, 2, . . . , 48) is described as $\mu_q(s)$.

Figure 13:
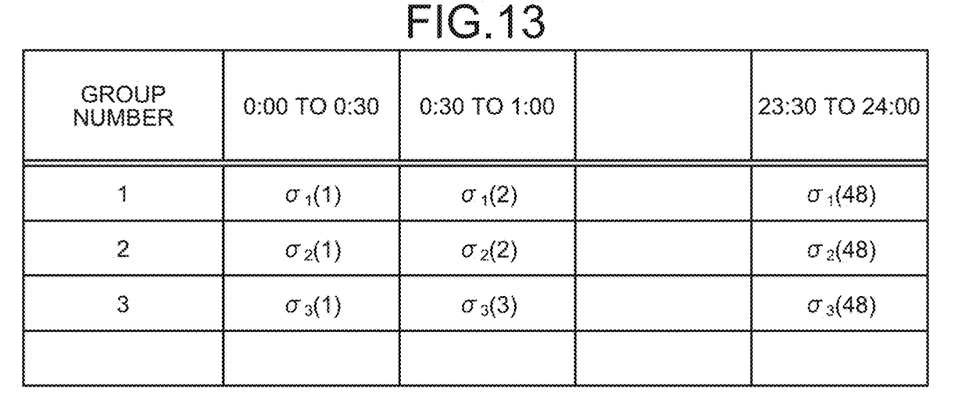
FIG. 13 is a table illustrating an example of standard deviations stored in a standard deviation DB.

FIG. 13 is a table illustrating an example of standard deviations stored in the standard deviation DB 16. As illustrated in FIG. 13, the standard deviation in each time zone for each group is stored in the standard deviation DB 16. In FIG. 13, in a manner similar to the example of FIG. 12, when first to 48th time zones in units of 30 minutes are defined, the average for the q-th group in the s-th time zone is described as $\sigma_q(s)$.

Next, the timing at which the preprocessing unit 12 performs the processes described above will be explained. As described above, the second time zone may be or may not be the same as the first time zone, which is a time zone in which the part of meter data acquired from the MDMS 10 in step S1 described with reference to FIG. 6 are metered. In a case where the first time zone and the second time zone are not the same, the first time zone typically includes a time zone before the second time zone. For example, an average and a standard deviation are calculated in advance using the part of meter data metered in the first time zone, and the process of estimating a system state is performed using meter data newly acquired in the second time zone. Thus, in a case where the first time zone and the second time zone are different from each other, the classification unit 121 classifies first meter data, which are meter data metered in the first time zone by at least some of a plurality of smart meters 7, into a plurality of groups. The statistic calculation unit 122 then calculates a standard deviation, which is variation of the first meter data, for each group, and the used data determination unit 131 determines whether to use the meter data in the second time zone or a substitute value in the estimation process of estimating the system state on the basis of the standard deviation. In a case where the average and the standard deviation are calculated using meter data in the first time zone before the second time zone, that is, previous meter data, the average and the standard deviation can be updated in predetermined cycles such as, typically, once a half year or once a year.

Note that, in a case where temporal factors such as the season and the month are included in the definition of groups, the system state estimation device 11 may calculate the average and the standard deviation after meter data of some smart meters 7 for one year are accumulated, for example. In addition, the first time zone may be constituted by a plurality of time zones that are not temporally continuous. For example, the average and the standard deviation for a group having a group number 1 in a time zone from 0:00 to 0:30 may be obtained on the basis of meter data in the group having the group number 1 in the time zone from 0:00 to 0:30 on May 1, and meter data in the group having the group number 1 in the time zone from 0:00 to 0:30 on May 2.

In addition, instead of the procedures described in FIG. 6, steps S1 to S3 may be performed periodically such as every 30 minutes, and a process of determining whether or not to update the average DB 15 and the standard deviation DB 16 with the calculated standard deviation may be performed. For example, steps S1 to S3 are performed periodically such as every 30 minutes, and such a process as not updating the average DB 15 and the standard deviation DB 16 when the difference between the calculated standard deviation and the standard deviation stored in the standard deviation DB 16 is equal to or smaller than a threshold and updating the average DB 15 and the standard deviation DB 16 when the difference exceeds the threshold is performed.

In contrast, in a case where steps S1 to S4 described above are performed using part of meter data at time for estimation of a system state instead of using the average and the standard deviation calculated with use of previous data, the average and the standard deviation are basically updated at the same timing as the update of meter data for estimation of a system state. The update of the average and the standard deviation, however, need not be performed completely at the same timing as the update of meter data for estimation of a system state. For example, the processing of the average and the standard deviation may be temporally reduced in such a manner that the processing of the average and the standard deviation is performed once while the update of meter data used for estimation of a system state is performed twice, for example. In the case of using some of meter data at time for estimation of a system state instead of using the average and the standard deviation calculated using previous data, the classification unit 121 classifies first meter data, which are meter data metered by some of a plurality of smart meters 7, into a plurality of groups. In addition, the used data determination unit 131 determines, for each group, whether to use the meter data or a substitute value in the estimation process of estimating a system state, on the basis of the standard deviation.

Figure 14:
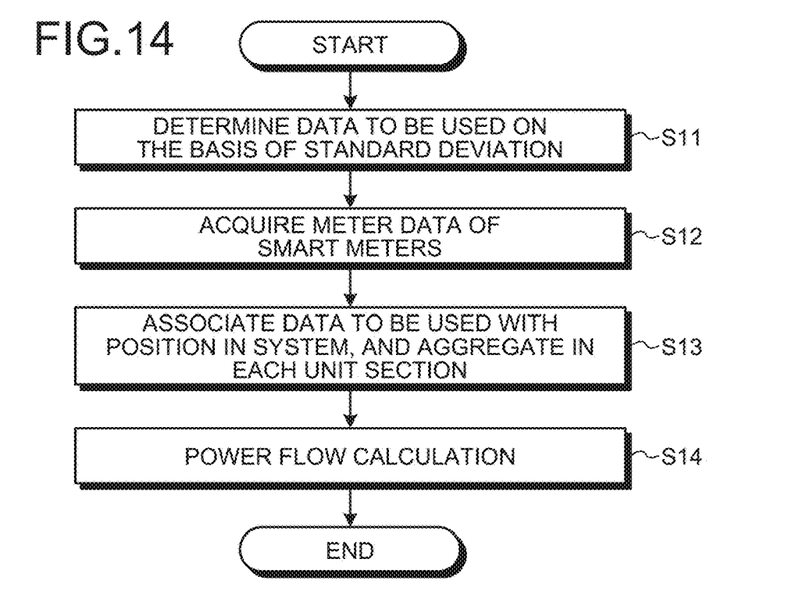
FIG. 14 is a flowchart illustrating an example of procedures performed by an estimation processing unit.

FIG. 14 is a flowchart illustrating an example of procedures performed by the estimation processing unit 13 of the present embodiment. As illustrated in FIG. 14, the used data determination unit 131 of the estimation processing unit 13 determines data to be used on the basis of the standard deviations stored in the standard deviation DB 16 (step S11). Subsequently, the used data determination unit 131 acquires meter data of smart meters 7, for which meter data are determined to be used data to be used, from the MDMS 10 (step S12). The used data determination unit 131 outputs, for each smart meter 7, data to be used, that is, either the substitute value or the meter data together with the SM number of the smart meter 7 to the aggregation unit 132 on the basis of the result of determination of the data to be used.

More specifically, the used data determination unit 131 performs, for each of the smart meters 7 corresponding to the meter data, a used data determination process of determining whether to use a substitute value or the meter data as data to be used on the basis of the standard deviation DB 16 and the contract DB 17. As described above, the used data determination unit 131 determines, in each time zone for each group, for example, that a substitute value is to be used when the standard deviation stored in the standard deviation DB 16 is equal to or smaller than a threshold, and that the meter data are to be used when the standard deviation exceeds the threshold. The threshold is calculated by formula (1) described above, for example.

Figure 15:
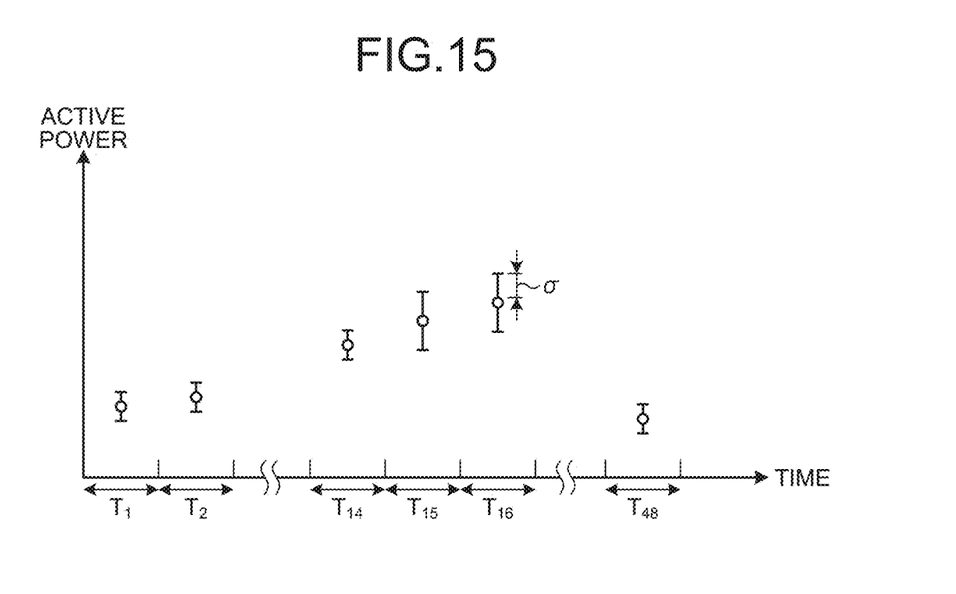
FIG. 15 is a graph illustrating an example of values of an average and a standard deviation in each time zone.
Figure 16:
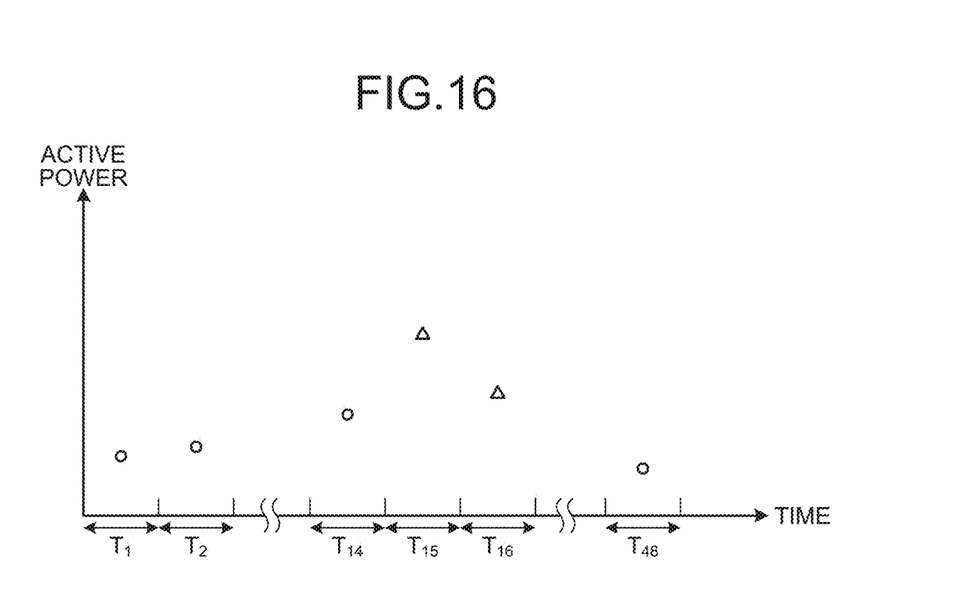
FIG. 16 is a graph illustrating an example of data to be used obtained using the averages and the standard deviations illustrated in FIG. 15.

FIG. 15 is a graph illustrating an example of values of the average and the standard deviation in each time zone. FIG. 15 is a graph in which the average and the standard deviation calculated for a certain group are plotted in each of time zones $T_1$ to $T_{48}$, which are 30-minute time zones. In FIG. 15, circles represent average values $\mu$, and lines on and under the circles represent standard deviations $\sigma$. FIG. 16 is a graph illustrating an example of data to be used obtained using the averages and the standard deviations illustrated in FIG. 15. FIG. 16 illustrates an example of data to be used, which are output from the used data determination unit 131, for a certain smart meter 7. Circles in FIG. 16 represent the average values illustrated in FIG. 15, and triangles in FIG. 16 represent meter data. In the example illustrated in FIG. 16, the average is used as the data to be used in the time zone $T_1$ because the standard deviation $\sigma$ is equal to or smaller than the threshold, and the meter data are used as the data to be used in the time zone $T_{15}$ because the standard deviation $\sigma$ exceeds the threshold, for example. In this manner, the used data determination unit 131 outputs an average or an average that is a substitute value in each time zone as the data to be used of each smart meter 7.

The description refers back to FIG. 14, in which the aggregation unit 132 subsequently associates the data to be used with a position in the system, and performs aggregation in each unit section (step S13). More specifically, the aggregation unit 132 determines which unit section the data to be used are associated with by using the smart meter installation position DB 18, and aggregates active powers and reactive powers in each unit section. The power flow calculation unit 133 performs power flow calculation by using the result of aggregation performed by the aggregation unit 132 (step S14). The process of estimating a system state is thus terminated.

Voltage distribution, current distribution, and the like calculated by the power flow calculation unit 133 are used for voltage control in the power distribution system, facility planning in the power distribution system, and the like. In addition, as described above, the result of aggregation performed by the aggregation unit 132 may be used to obtain the load on each pole-mounted transformer 5. Furthermore, while the average is used as the substitute value for calculating voltage distribution and the like in the example described above, the maximum value may be saved instead of the average for the purpose of determining overload of each pole-mounted transformer 5, or the like. For determining overload of a pole-mounted transformer 5, the used data determination unit 131 then determines whether to use the saved maximum value or the last meter data. In this case, the process of estimating a system state is a process of obtaining the load on the pole-mounted transformer 5, and the system state estimation device includes an estimation unit that performs a process of obtaining the load on the pole-mounted transformer 5 on the basis of the result of determination to use the maximum value or to use the last meter data.

As a result of the processes described above, meter data used in the process of estimating a system state are reduced. Thus, the hardware size of the system state estimation device is reduced. While the used data determination unit 131 acquires only meter data of smart meters 7 determined to be used as the data to be used from the MDMS 10 in the example described above, the used data determination unit 131 is not limited thereto, and may once acquire meter data of all the smart meters 7 regardless of the results of determination on the data to be used, and extract and save necessary meter data.

Note that, as described above, results of aggregation in each unit section may be saved as the average and the standard deviation, and the aggregation unit 132 may use the average resulting from the aggregation in each unit section, for a group and a time zone for which the substitute value is determined to be used.

While the process of determining data to be used is performed for each group in the example described above, the process of determining data to be used may be performed on the basis of the standard deviation in each time zone without classification into groups, that is, with the number of groups being one.

In addition, while the standard deviation of meter data of each group is used as the variation in the example described above, an operation value other than the standard deviation may be used. For example, dispersion, or a difference between a maximum value and a minimum value may be used as the variation.

In addition, the process of determining data to be used is based on the standard deviation in one time zone of smart meters 7 belonging to one group in the description above. Specifically, in the example described above, the standard deviation used for determination of data to be used is the standard deviation among a plurality of meter data belonging to one group and metered in one time zone. The process of determining data to be used is not, however, limited thereto, and may be based on temporal variation of one smart meter 7. In this case, the standard deviation used for the determination of data to be used is variation among a plurality of meter data belonging to one group and metered in a plurality of time zones. In this case, the average and the standard deviation of 48 pieces of data of one smart meter 7 in time zones in a month are obtained, and when the standard deviation is equal to or smaller than a threshold, the smart meter 7 uses the average instead of the meter data in the process of estimating a system state. In this case as well, the average and the standard deviation may be calculated for each group by using the season, the day of week, the temperature, the weather, or the like as the definition of groups, and the process of determining data to be used may be performed for each group. Thus, in this case as well, the groups may be determined on the basis of at least one of the season, the temperature, and the weather at metering of the meter data. In addition, meter data may be corrected on the basis of at least one of the season, the temperature and the weather at metering of the meter data.

In addition, the process of determining data to be used may be performed using a combination of variation among smart meters 7 and temporal variation. For example, classification into groups may be performed according to the industry type, the process of determining data to be used may be performed on the basis of the standard deviation for each industry type, and the process of determining data to be used may be based on the temporal variation of one smart meter 7 for a group having a standard deviation larger than a threshold.

In addition, while examples of the power distribution system have been described above, the operations and the configurations of the present embodiment are not limited to power distribution systems but are applicable to overall power systems such as power transmission systems.

The configurations presented in the embodiment above are examples of the present invention, and can be combined with other known technologies or can be partly omitted or modified without departing from the scope of the present invention.

REFERENCE SIGNS LIST

1-1 to 1-3 LRT; 2-1 to 2-2 switch with sensor; 3-1 to 3-6 distribution line; 4 high-voltage load; 5-1, 5-2 pole-mounted transformer; 6-1 to 6-4 low-voltage load; 7-1 to 7-4 smart meter; 8-1, 8-2 concentrator; 9 HES; 10 MDMS; 11 system state estimation device; 12 preprocessing unit; 13 estimation processing unit; 121 classification unit; 122 statistic calculation unit; 131 used data determination unit; 132 aggregation unit; 133 power flow calculation unit.

The invention claimed is:

1. A system state estimation device comprising:
a processor; and
a memory to store a program which, when executed by the processor, performs processes of:
classifying first meter data into a plurality of groups, the first meter data being meter data metered in a first time zone by at least some of a plurality of metering devices;
calculating variation of the first meter data for each of the groups of the classification;
determining, for each of the groups, whether to use a substitute value or meter data in a second time zone in estimation computation for estimating a system state, on the basis of the variation; and
performing the estimation computation on the basis of a result of determination, wherein
the processor determines that the substitute value is to be used when the variation is equal to or smaller than a threshold, and determines that the meter data in the second time zone are to be used when the variation exceeds the threshold, and
the threshold is determined on the basis of error required in a system and the number of metering devices belonging to each of the groups.

2. The system state estimation device according to claim 1, wherein the first time zone includes a time zone before the second time zone.

3. The system state estimation device according to claim 1, wherein the variation is a variation among a plurality of pieces of meter data metered in one time zone and belonging to one group.

4. The system state estimation device according to claim 1, wherein the groups are determined on the basis of at least one of contract types and industry types of consumers associated with the metering devices.

5. The system state estimation device according to claim 1, wherein the groups are determined on the basis of contract capacities of consumers associated with the metering devices.

6. The system state estimation device according to claim 1, wherein
in the classification, the processor corrects the first meter data on the basis of contract capacities, and
in the calculation, the processor calculates the variation by using the corrected first meter data.

7. The system state estimation device according to claim 1, wherein the variation is a variation among a plurality of pieces of meter data metered in a plurality of time zones and belonging to one group.

8. The system state estimation device according to claim 1, wherein the groups are determined on the basis of at least one of seasons, temperatures and weather at metering of the meter data.

9. The system state estimation device according to claim 1, wherein
in the classification, the processor corrects the first meter data on the basis of at least one of seasons, temperatures, and weathers at metering of the first meter data, and
in the calculation, the processor calculates the variation on the basis of the corrected first meter data.

10. The system state estimation device according to claim 1, wherein the groups are determined on the basis of days of week.

11. The system state estimation device according to claim 1, wherein the variation is a standard deviation of the first meter data, and the substitute value is an average of the first meter data.

12. The system state estimation device according to claim 11, wherein when an error required in a system is represented by £, the number of metering devices belonging to a group is represented by N, and k is a constant, the threshold is $\varepsilon/(k \times \sqrt{N})$.

13. A system state estimation device comprising:
a processor; and
a memory to store a program which, when executed by the processor, performs processes of:
classifying first meter data into a plurality of groups, the first meter data being meter data metered by some of a plurality of metering devices;
calculating variation of the first meter data for each of the groups of the classification;
determining, for each of the groups, whether to use meter data or substitute values in estimation computation for estimating a system state, on the basis of the variation; and
performing the estimation computation on the basis of a result of determination, wherein
the processor determines that the substitute value is to be used when the variation is equal to or smaller than a threshold, and determines that the meter data are to be used when the variation exceeds the threshold, and
the threshold is determined on the basis of error required in a system and the number of metering devices belonging to each of the groups.

14. A system state estimation method in a system state estimation device, the system state estimation method comprising:
classifying first meter data into a plurality of groups, the first meter data being meter data metered in a first time zone by at least some of a plurality of metering devices;
calculating variation of the first meter data for each of the groups of the classification;
determining, for each of the groups, whether to use a substitute value or meter data in a second time zone in estimation computation for estimating a system state on the basis of the variation; and
performing the estimation computation on the basis of a result of determination, wherein
in the determination, it is determined that the substitute value is to be used when the variation is equal to or smaller than a threshold, and it is determined that the meter data in the second time zone are to be used when the variation exceeds the threshold, and
the threshold is determined on the basis of error required in a system and the number of metering devices belonging to each of the groups.

15. A system state estimation method in a system state estimation device, the system state estimation method comprising:
classifying first meter data into a plurality of groups, the first meter data being meter data metered by some of a plurality of metering devices;
calculating variation of the first meter data for each of the groups of the classification;
determining, for each of the groups, whether to use meter data or a substitute value in estimation computation for estimating a system state on the basis of the variation; and
performing the estimation computation on the basis of a result of determination, wherein in the determination, it is determined that the substitute value is to be used when the variation is equal to or smaller than a threshold, and it is determined that the meter data are to be used when the variation exceeds the threshold, and
the threshold is determined on the basis of error required in a system and the number of metering devices belonging to each of the groups.

\* \* \* \* \*